United States Patent [19]
Nickol

[11] Patent Number: 6,007,239
[45] Date of Patent: Dec. 28, 1999

[54] TEMPERATURE SENSING PROBE COMPARATOR

[76] Inventor: Jerry L. Nickol, 7410 Hillside La., Solon, Ohio 44139

[21] Appl. No.: 08/838,721

[22] Filed: Apr. 9, 1997

Related U.S. Application Data

[60] Provisional application No. 60/015,129, Apr. 10, 1996.

[51] Int. Cl.$^6$ .................................................. G01K 15/00
[52] U.S. Cl. ........................................................... 374/1
[58] Field of Search ...................................................... 374/1

[56] References Cited

U.S. PATENT DOCUMENTS

| | | | |
|---|---|---|---|
| 2,162,614 | 6/1939 | Fry et al. ....................................... | 374/1 |
| 3,699,800 | 10/1972 | Waldron ....................................... | 374/1 |
| 4,075,882 | 2/1978 | Waldron ....................................... | 374/1 |
| 4,643,586 | 2/1987 | Hansen ......................................... | 374/1 |
| 4,901,257 | 2/1990 | Chang et al. ................................. | 374/1 |
| 5,355,683 | 10/1994 | Taylor .......................................... | 374/1 |
| 5,678,923 | 10/1997 | Germanow et al. .......................... | 374/1 |
| 5,741,073 | 4/1998 | Ribeiro et al. ................................ | 374/1 |

OTHER PUBLICATIONS

"What Everyone Asks Us About Thermoelectrics", Melcor Corporation, 1040 Spruce Street, Trenton, NJ, USA, p. 5.
"An Introduction to Thermoelectrics", Tellurex Corp., 1248 Hastings, Traverse City, TX, 1994.

*Primary Examiner*—Randy W. Gibson
*Attorney, Agent, or Firm*—Pearne, Gordon, McCoy & Granger LLP

[57] ABSTRACT

Calibration apparatus or comparators for testing temperature-sensing probes at elevated and reduced temperatures reduce or neutralize heat transfer along the extent of the heat sensor to obtain more rapid and accurate test results. A single cylindrical temperature controlled oven is formed in a metal block into which is inserted the probe to be tested. The oven is of sufficient diameter to receive probes having a wide range of cross-sectional configurations, and is not limited to probes having straight cylindrical shapes. To neutralize heat flow along the stem of the probe, a pair of actively cooled or heated adjustable jaws are secured to the metal block and positioned to grip the outboard stem of the probe. When the temperature of the jaws and the temperature of the probe are equal, the temperature sensed by the probe is compared to the known temperature of the oven. The difference between the two temperatures determined whether the temperature-sensing probe is functioning properly.

27 Claims, 5 Drawing Sheets

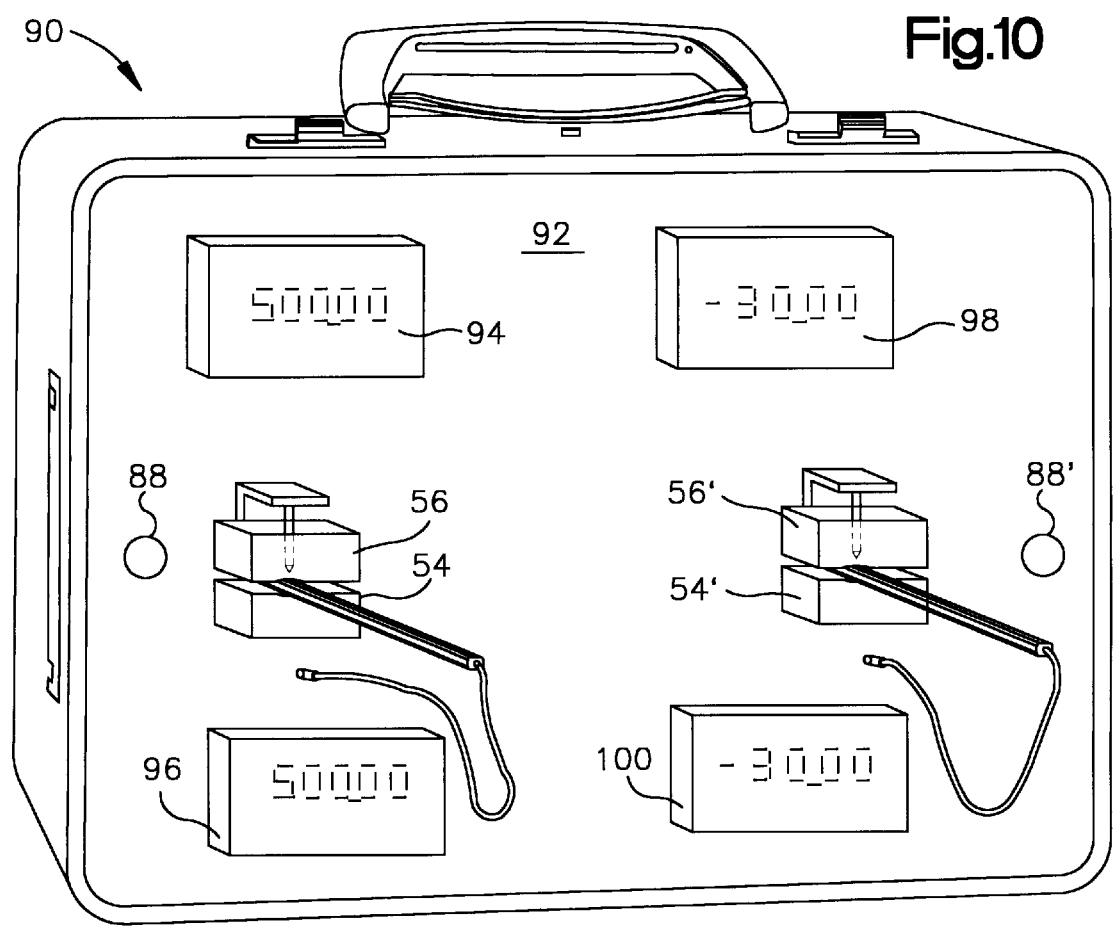

TEMPERATURE SENSING PROBE COMPARATOR

This application claims benefit of U.S. application Ser. No. 60/015,129, filed Apr. 10, 1996.

BACKGROUND OF INVENTION

1. Field of Invention

The field of invention relates to apparatus and methods for determining whether heat sensors are within permissible tolerances for their intended purposes

2. Description of Related Art

Heat sensors may be in the form of thermocouples, resistance temperature detectors, thermistors, temperature transmitters, bi-metal thermometers, mercury glass thermometers, or other such similar devices. There is widespread need for accurate heat sensors in industry and in the military, including such applications as missile silos, tanks, battleships, aircraft, chemical processes, steel making, plastic injection molding, autoclaves, hot water tanks, medical appliances, automobiles, and domestic appliances, such as ovens, refrigerators, and microwaves.

For heat sensors to perform their intended function, it is critical that they be accurate within a predetermined tolerance of a prescribed set point temperature, and that they be tested periodically for accuracy. Devices for such testing are available in the prior art, and are referred to by some suppliers as temperature calibration instruments.

The prior art device closest to the subject invention known to Applicant is his own invention, marketed by ThermaCal, Inc., and identified as "Model 18 Calibration Cool/Heat Source." In this device, an elongated, rectangular metal block is provided with a longitudinal cylindrical bore hole, which performs as an oven, having a diameter sufficient for a slip fit with the pencil-shaped cylindrical probe being tested. The metal block is preheated to a set point temperature, whereinafter the probe is inserted in the bore hole and the temperature for the metal block sensed by the probe is recorded or observed on suitable equipment designed for this purpose. If the sensed temperature is within the prescribed tolerance for the probe being tested, the probe may be returned to service. If not, either the probe may be scrapped, or the heat source mechanism being monitored by the probe may be recalibrated to function properly within the predetermined actual known tolerance of the probe.

It is customary for each block to have a plurality of bore holes, each of a different diameter, in order to accommodate probes of different diameters. The bore hole diameters are usually not less than 0.0625 inches, and 90 percent of the commercial market can be serviced with bore hole diameters between 0.0625 and 0.625 inches.

The prior art device just discussed is limited to testing cylindrical probes. The industrial market for temperature sensor, however, is highly diverse. This diversity has resulted in the design of many application-specific temperature sensing probes, such as those illustrated in prior art FIGS. 1, 2, and 3. Probe 1 of FIG. 1 is a Type J thermocouple probe used in plastic molding machines, wherein the ferrule 2 provides a seal against hot high pressure plastics. Because of its enlarged configuration, the probe cannot be tested in prior art devices such as the ThermaCal, Inc., Model 18 comparator described above. Some Type J thermocouples, therefore, must be tested by other means, such as by hot oil baths, which are expensive, cumbersome, and not easily portable.

Probes for domestic appliances, FIG. 2, such as ovens, hot water heaters, refrigerators, dishwashers, gas-fired space heaters and the like, are mass produced, low cost, temperature sensors. A resistance temperature detector (RTD) substrate 3 is inserted into an open-ended tube 4. Then the tube ends 5 and 6 are swaged or clamped shut about the substrate. The technique is inexpensive, and the finished product is not liquid-tight. Therefore, this class of probe cannot even be tested in an oil bath. Furthermore, because of the irregular shape resulting from swaging, these probes cannot be effectively tested in the ThermaCal, Inc., Model 18 type comparator.

A pharmaceutical in-pipe probe 7, including threaded nut 8 and sleeve 9, such as shown in FIG. 3, like the FIG. 2 probe for domestic appliances, cannot be tested in a Model 18 type comparator because of its irregular shape. Because the sleeve 9 is not sealed against fluid penetration, testing in a hot oil bath is a very delicate procedure.

Prior art comparators with multi-hole metal blocks also have a source of error referred to as hole-to-hole non-uniformity of temperature. Usually this error is a few tenths of a degree Celsius, which is bothersome in many applications since a hole at the top of the block may not be at the same temperature as a hole at the bottom of the block.

Heretofore, only temperature sensors having cylindrical probes could be efficiently tested in prior art testing devices, such as Applicant's Model 18 comparator. Now, for the first time, irregularly shaped temperature sensors, such as shown in FIGS. 1, 2, and 3, can be efficiently and inexpensively tested in Applicant's subject inventive comparator. This fact is particularly significant with respect to inexpensive domestic appliance temperature sensing probes, such as shown in FIG. 2. Because these probes can now be accurately tested, they can be used in more sophisticated mechanisms that require extreme accuracy in temperature control. Thus, Applicant's inventive comparator has opened a wide range of new markets for low cost, previously untestable, temperature sensors.

SUMMARY OF INVENTION

In the subject invention, Applicant has eliminated all bore holes in the metal block but one, which has a diameter sufficient to service at least the same number of probes as prior art comparators, i.e., probes with dimensions within the range of 0.0625 through 0.625 inches. With only one bore hole, less metal is required for the block, which requires less energy to heat and heats more quickly. As a consequence, in addition to being operable with alternating current, the inventive comparator can be operated with a DC rechargeable battery having a low ampere-hour rating. A battery-operated comparator has the advantage of mobility not possible with comparators designed for operation only with alternating current.

Theoretically, there is no lower limit of probe cross section that can be tested, and the upper limit is a function of the cross section of the block. All intermediate size diameters of probes, whether metric or American Standard, can be tested with the assistance of a pair of jaws in which at least one of the jaws is spring biased. Therefore, the jaws can receive therebetween probes of many configurations and dimensions within the expansion limits of the jaws.

Another feature of the invention is the reduction to zero of heat conductivity along the stem of the heat sensor. In making theoretical calculations of thermal conductivity of a long thin sheath such as a temperature probe, the probe reaches the temperature of the heating medium, such as a metal block calibrator, when the Biot number hL/k is maximized, wherein:

h=heat transfer coefficient of heating medium to the PUT (Probe Under Test);

L=PUT heated sheath length; and k=thermal conductivity of PUT sheath material.

All other parameters of a probe being equal, a long thin sheath of low thermal conductive material is desired in order to reduce temperature gradients down the sheath. However, in the subject invention, heat injection probe-gripping jaws exterior of the heating medium cause the effective thermal conductivity to approach zero as T1, the temperature of the probe, approaches T2, the temperature of the probe-gripping means, causing the effective Biot number to increase. In prior art bored metal blocks, the desirable high value of h, the coefficient of heat transfer, necessarily requires that there be a close fit, i.e., within 0.01 inches, between the PUT and the bored hole. Applicant is not aware of any prior art comparator that utilizes heat flow neutralization to more quickly and more accurately reach and maintain temperature stabilization between the heat source oven and the PUT.

It should be appreciated that the jaws as well as the metallic block may transfer heat to or from the probe depending upon the intended operating temperature of the probe. In both cases, the temperature of the jaws and the received portion of the probe is controlled to maintain little or no heat transfer along the length of the probe. In the case of high temperature probes, the temperatures T1 and T2 are substantially matched or equal and may be said to be in heat transfer equilibrium such that any heat transfer along the probe is negligible and/or does not affect the calibration of the probe for its intended purpose. In the case of cold temperature probes, the temperatures T1 and T2 need not be equal or as closely matched in order to be in heat transfer equilibrium, and satisfactory results have been obtained with the temperature differences in the order of several degrees, e.g. 2 or 3 degrees centigrade. This range of tolerance is believed to be related in-part to the relatively more narrow cold temperature range, e.g. −30° to 20° C., and the correspondingly decreased temperature difference driving the heat transfer.

OBJECTS OF THE INVENTION

It is therefore among the objects of this invention to provide an novel temperature sensor probe testing device that is not limited to testing only a few sizes of probe diameters and is operable on either AC or DC energy.

Another object of the invention is to provide a novel temperature sensor probe testing device that is not limited to testing probes with uniform circular cross sections.

Another object of the invention is to provide a novel temperature sensor probe testing device that eliminates hole-to hole non-uniformity of temperature.

Another object of the invention is to provide a novel temperature sensor probe testing device that is lightweight and portable.

Another object of the invention is to provide a novel temperature sensor probe testing device that has adjustable spring-loaded jaws to accept and to test any size cross section or shape of probe, limited only by the cross section of the testing block.

Another object of the invention is to provide a novel temperature sensor probe testing device that can cool probes to a temperature set point within the range of −30° to 20° C.

Another object of the invention is to provide a novel temperature sensor probe testing device that can heat probes to a temperature set point within the range of 20° to 650° C.

Still another object of the invention is to provide a novel temperature sensor probe testing device that can open new markets for previously untestable, or difficult to test, inexpensive temperature sensors.

Yet another object of the invention is to provide a novel temperature sensor probe testing device that enables the use of inexpensive temperature sensors with temperature-sensitive, high tech, devices.

BRIEF DESCRIPTION OF THE DRAWINGS

The foregoing and other objects and features of the invention will become apparent from the following description of preferred embodiments of the invention with reference to the accompanying drawings, in which:

FIG. 10 is a front elevational perspective view of a preferred embodiment of an instrument panel and carrying case, with the lid removed, in which the inventive comparator components may be mounted and transported.

DESCRIPTION OF PREFERRED EMBODIMENTS OF THE INVENTION

Figure 1:
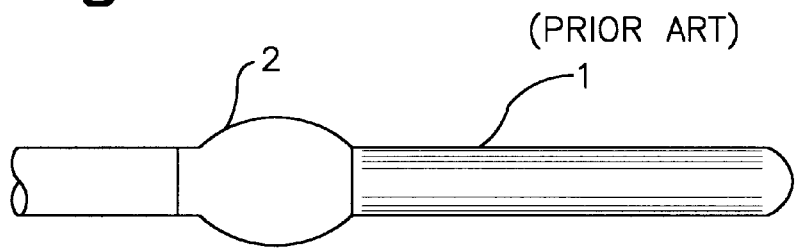
FIG. 1 is an elevational view of a prior art Type J thermocouple probe.
Figure 2:
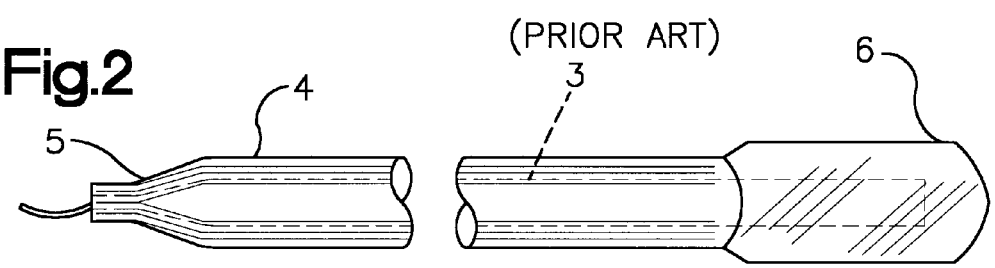
FIG. 2 is an elevational view of a prior art domestic appliance probe.
Figure 3:
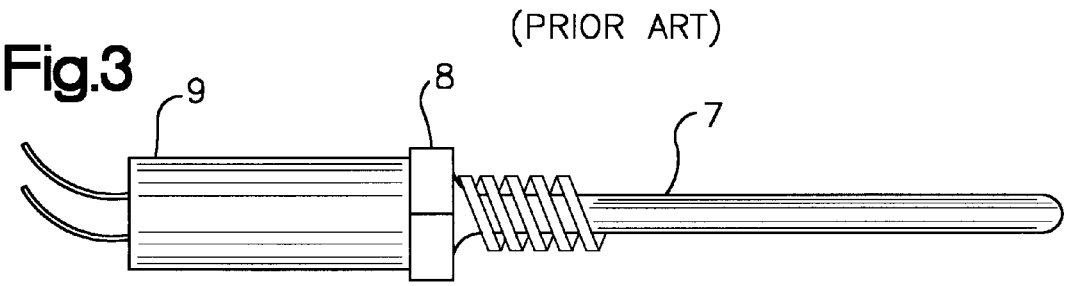
FIG. 3 is an elevational view of a prior art pharmaceutical in-pipe probe.
Figure 4:
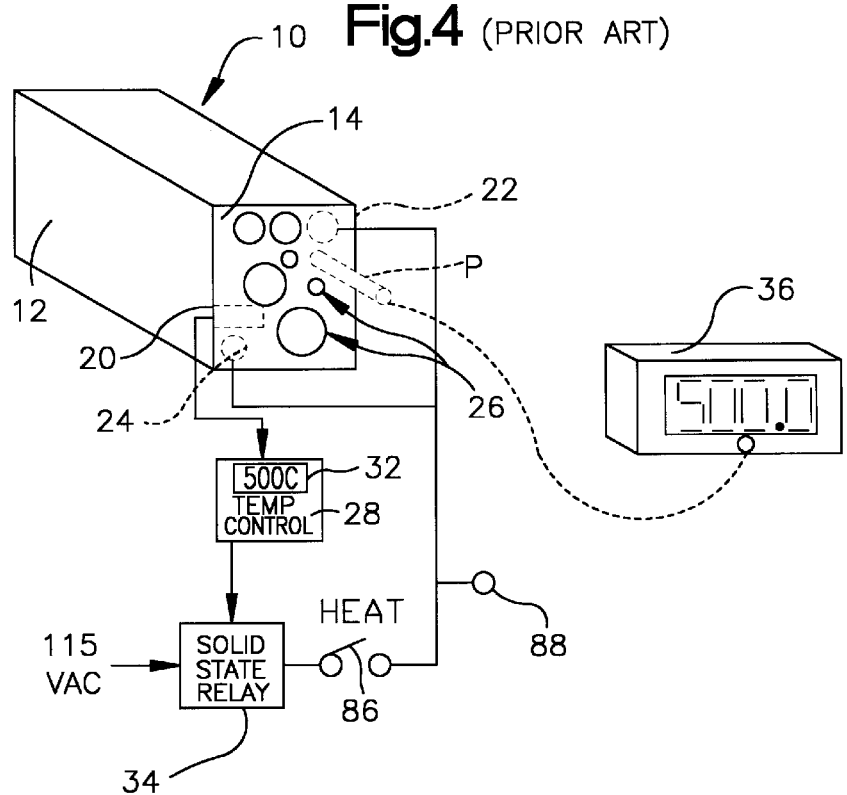
FIG. 4 is a perspective view of Applicant's prior art heat comparator.
Figure 6:
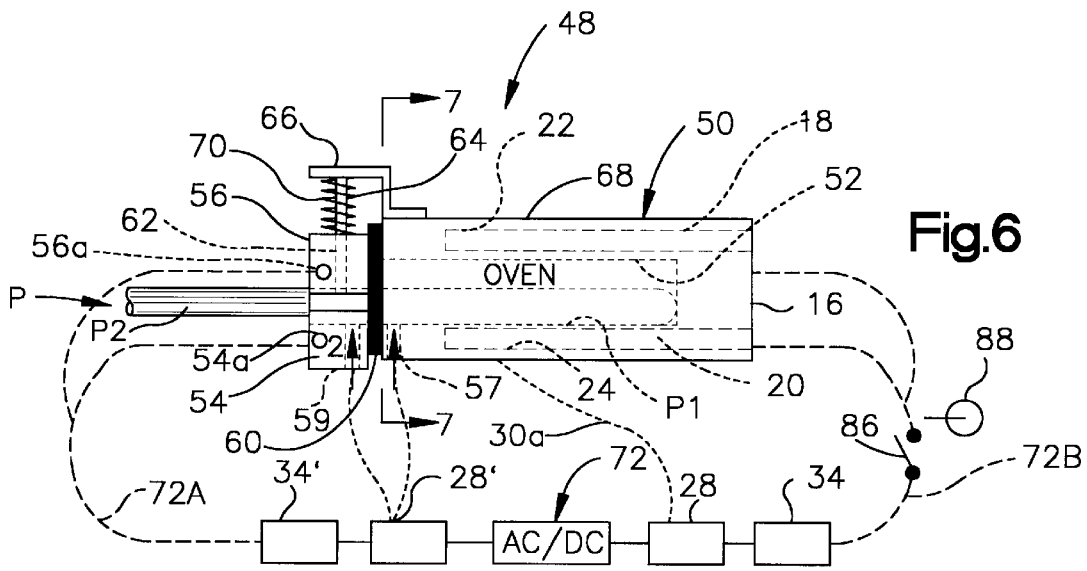
FIG. 6 is an elevational side view of a preferred embodiment of an inventive comparator heat component.

Referring first to FIG. 4, therein is shown a prior art heat comparator 10, comprising a heat source metal block 12, having a front face 14 and a rear face 16, that is heated by one or more cylindrical cartridge ni-chrome heaters 18 and 20, FIG. 6, inserted in bore holes 22 and 24, aligned with the longitudinal axis of the block 12. The bore holes 22 and 24 are formed in the rear face 16 of the block 12. A plurality of temperature sensor probe bore holes 26, ranging in diameter from 0.0625 inches to 0.625 inches, are formed in the front face 14 of the block 12. Although there are seven probe bore holes shown, other numbers of bore holes may be provide, limited only to the area of the front face 14 available to receive these holes.

To regulate heaters 18 and 20, a temperature control 28 signals the temperature of metal block 12 by means of a resistance temperature detector (RTD) 30. The measured temperature is compared to a set point temperature shown on LCD 32. When the temperature of metal block 12 stabilizes at the set point temperature shown on LCD 32, solid state relay 34 functions to hold the temperature of metal block 12 to the set point temperature.

To test a temperature sensor probe P, which must be cylindrical in shape, the diameter of the probe P must be matched to the closest diameter bore hole 26 in order to maximize h, the coefficient of heat transfer of the heating medium or block 12 to the probe P. A temperature readout, such as a digital LCD 36, displays the temperature of the probe P. It normally requires 8 to 10 minutes to bring the probe P up to the temperature of metal block 12, whereupon the digital LCD 36 notes the temperature sensed by the probe P. If, as shown in FIG. 4, the temperatures sensed by the probe P, displayed at LCD 36, is the same, within predetermined tolerances, as the set point temperature shown at LCD 32, the probe P is deemed to be functioning properly and may be returned to service or, if new, installed in original equipment.

Figure 5:
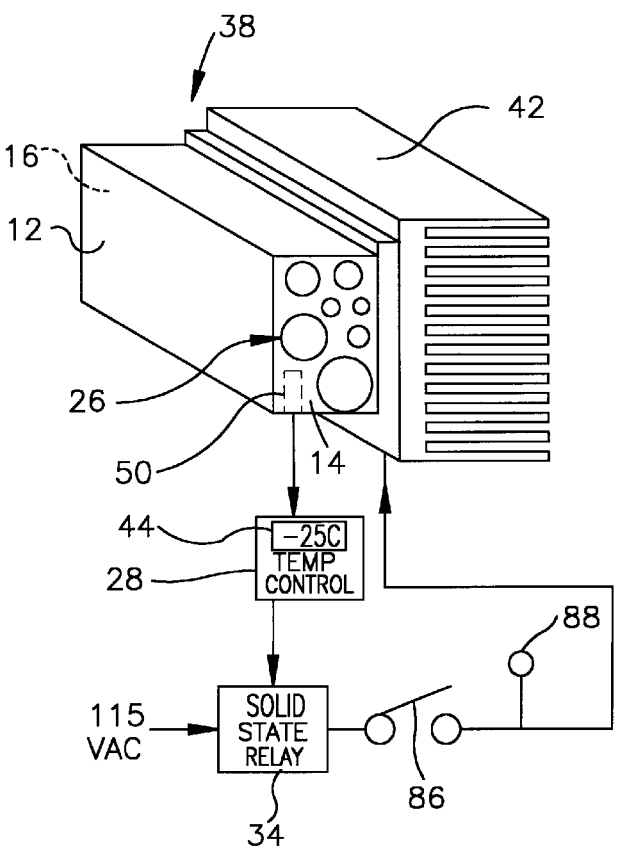
FIG. 5 is a perspective view of Applicant's prior art cold comparator.

FIG. 5 shows a prior art cold comparator 38, comprising a metal block cool source 12 and a heat sink 42. Metal block 12 and temperature sensor probe bore holes 26 are the same as previously described with reference to FIG. 4. Heat is transferred from metal block 12 to heat sink 42 by means of a thermoelectric module or solid state heat pump 80, FIG. 9, positioned between the interface of metal block 12 and heat sink 42. A fan 82, FIG. 9, dispels heat from the heat sink 42 into the ambient atmosphere. The heat pump 80 comprises an assembly of several hundred thermocouples that produce a temperature gradient when an emf is applied. Thermally interfacing metal block 12 to heat sink 42 drives the temperature of the metal block 12 down to any level required for testing purposes. To regulate the temperature of metal block 12, the temperature control 28 measures the temperature of metal block 12 by means of reference RTD 30. As with the device disclosed in FIG. 4, when the temperature of the metal block is lowered to the set point shown on LCD 44, temperature control 28 gates the solid state relay 34 which functions to hold the temperature of the metal block to the set point. The set point shown on LCD 44 in FIG. 5, for purposes of illustration, is set at –25 C. A cylindrical temperature probe P must then be inserted into the appropriate bore hole 26 for testing in the same manner as described with reference to FIG. 4.

Figure 7:
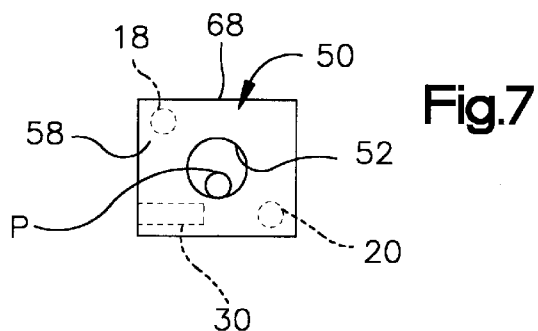
FIG. 7 is a front elevational view of the inventive comparator taken along the line 7—7 of FIG. 6.
Figure 8:
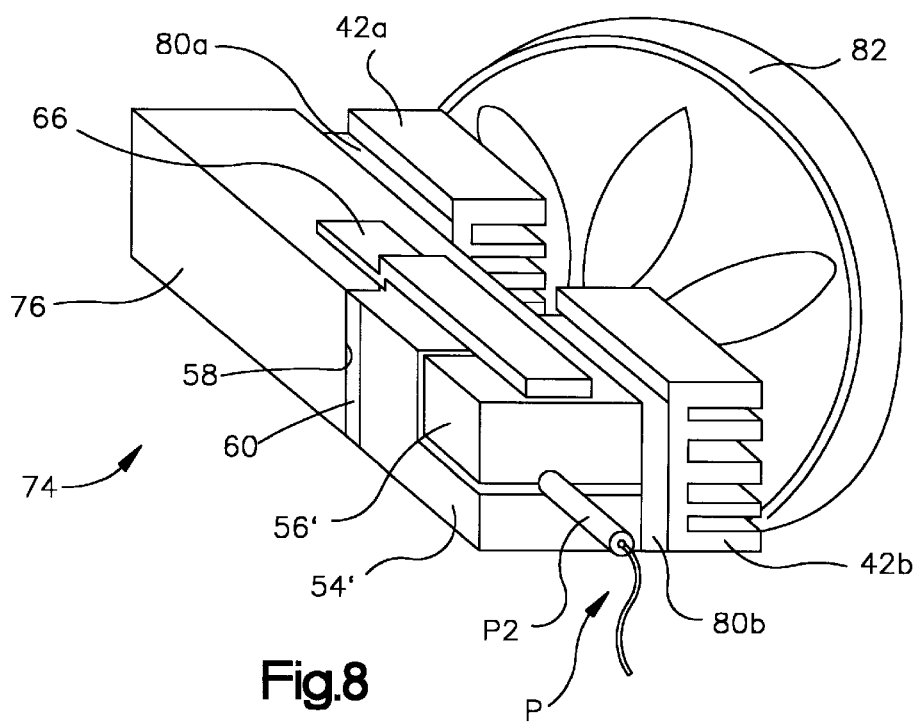
FIG. 8 is a perspective view of a preferred embodiment of an inventive comparator cold component.

FIGS. 6 and 7 show a preferred embodiment of a comparator 48 in accordance with the subject invention for testing heat sensor probes. The comparator 50 includes a metal block 50 that may be of any configuration best suited for a particular testing installation. The block 50, made of an aluminum alloy in the preferred embodiment, houses a single bore hole oven 52, the diameter of which is selected to receive the largest cross-sectional dimensions of the sensor probe intended to be tested by this particular oven. Before the sensor probe P can be inserted in the oven 52, it must first pass through a pair of jaws 54 and 56. (See also comparable jaws 54' and 56' of FIG. 8.) Lower jaw 54 is rigidly secured to the lower portion of the front face 58 of block 50, FIG. 7. Upper jaw 56 is provided with a vertical bore 62 which telescopically slip fits over vertical rod 64. Bracket 66, secured to the top face 68 of block 50, rigidly secures and holds vertical rod 64 in place. Bracket 66 and upper jaw 56 compress a spring 70 therebetween for the purpose of biasing upper jaw 56 downwardly on rod 64 into pressure engagement with the top surface of sensor probe P. An insulation partition 60, secured to front face 58 of block 50, thermally isolates the oven 52 from the jaws 54 and 56. As shown in FIG. 8, the upper face of lower jaw 54' and the lower face of upper jaw 56' are both contoured to provide better contact between the probe P and the jaws 54' and 56'.

FIG. 6 shows the same configuration in jaws 54 and 56. As shown in FIGS. 6 and 8, a first portion P1 of the probe P is received in the oven and a second portion P2 of the probe is received in the adjacent jaws.

A temperature control 28' and solid state relay 34', similar to those described and shown FIGS. 4 and 5 with respect to control 28 and relay 34, inject and maintain heat from AC/DC heat source 72 equal and opposite to the heat being conducted down the stem of the probe P. Again referring to FIG. 6, a small point sensing thermocouple 57 at the shelf of the oven 52 adjacent face 58 of block 50 senses temperature T1 corresponding with the temperature of the probe portion P1. Temperature T2, corresponding with the temperature of the probe portion P2, is sensed similarly in the lower jaw 54 by thermocouple 59. The jaws 54 and 56 are each provided with a heater 54a and 54b, similar to heaters 18 and 20 but having lower outputs, for purposes of heating the received portion P2 of the probe P.

The thermocouples 57 and 59 effectively sense the temperatures of the adjacent portions P1 and P2 of the sheath of probe P within the oven 52 and jaws 54, 56. With T1 and T2 temperature sensors hooked up in a differential mode via lines 57a and 59a to temperature control 28', the jaw circuit drives the jaw temperatures until T2 equals T1, at which point there is essentially no heat flow down the sheath of the probe P between point T1 and T2. The jaw control circuitry 72A is independent of the oven control circuit 72B, FIG. 6. As described above, the latter includes RTD 30 connected by line 30a to temperature control 28 for sensing the temperature of the block 12 and oven 52 and comparison with the set point temperature.

Larger diameter probes P have more stem losses, which are dynamically compensated for with more jaw heat power. The natural period of the physically smaller jaw is much shorter that of the larger oven, which, along with the thermal decoupling by the insulation 60, prevents the two control circuits from resonating with each other. The spring 70 is located out of the heated area to prevent heat-induced fatigue. (The spring material is a chrome vanadium alloy form long spring life.)

To insert and to remove a probe, the operator slides the upper jaw 56 upwardly on rod 64, thereby further compressing spring 70. Upon release of spring 70, jaw 56 will move downwardly until it comes to rest on the upper face of the lower jaw 54.

The heat input to the comparator 48 is regulated to transfer heat to the block 50 to maintain its temperature substantially equal to the set point temperature as measured by the resistance temperature detector 30. The temperatures T1 and T2 of the adjacent portions of the probe P are substantially matched by regulation of heat input to the jaws 54 and 56 in order to neutralize heat flow in the sheath whereby there is no net heat flow along the sheath. Under these conditions, the effective thermal conductivity of the sheath of the probe P approaches zero and the Biot number is increased or maximized so as to enable calibration of the probe more quickly and accurately.

A preferred embodiment of the inventive cool comparator 74 is shown in FIG. 8. The structure and function of the jaw 54' and 56' are similar to those described with respect to jaws 54 and 56 of FIGS. 6 and 7. However, jaws 54', 56' and metal block 76 are not equipped with heaters, but rather, are provided with cooling apparatuses. More particularly, heat pumps 80a and 80b are mounted between the vertical interfaces of the jaws and block and their associated heat sinks 42a and 42b. The fan 82 draws air along and through the surfaces of each of the heat sinks 42a and 42b.

Figure 8A:
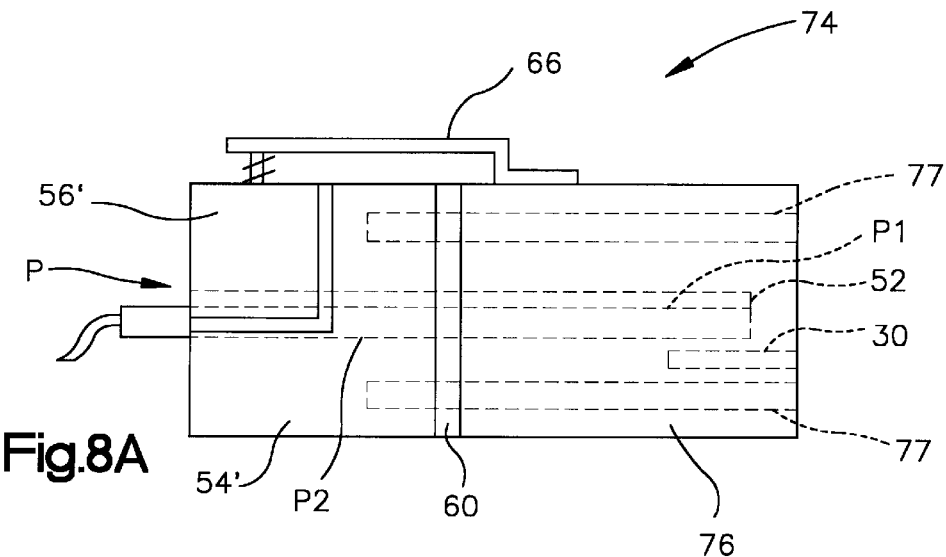
FIG. 8A is an elevational side view similar to FIG. 6 of the comparator cold component of FIG. 8, with parts omitted for clarity of illustration.
Figure 8B:
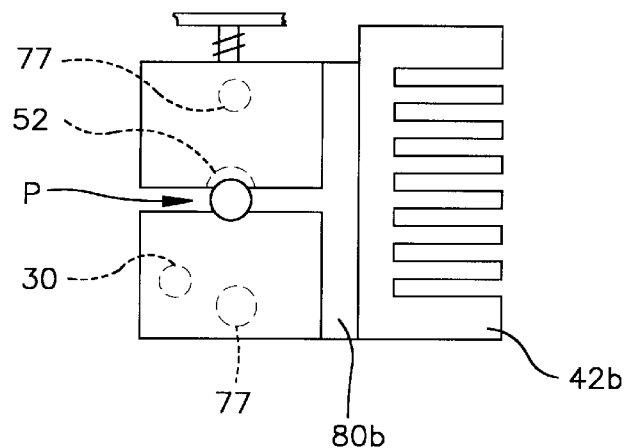
FIG. 8B is a front end view (of the comparator cold component of FIG. 8A.

Referring to FIGS. 8A and 8B, the comparator 74 is shown to include a modified jaw arrangement wherein a metallic lower jaw 54' has an L-shape and carries a non-metallic upper jaw 56'. The lower jaw 54', which may be formed of an aluminum alloy, is mounted to the block 76 by non-metallic support rods 77 formed of nylon to reduce heat transfer. Heat insulation 60 is disposed between the jaw 54' and the block 76. The non-metallic upper jaw 56' is spring biased to press the probe P against the jaw 54' thereby increasing the heat transfer between 54' and the probe P. The thermal conductivity of 56' is low relative to 54', thus there is negligible heat transfer between 56' and the probe P.

The heat sinks 42a, 42b and fan 82 are omitted from FIG. 8A for clarity of illustration. The heat pumps 80a and 80b respectively associated with the block 76 and the lower jaw 54' are of similar heat transfer capacity. The heat pumps 80a and 80b are driven by a common control in accordance with the matching of the temperature sensed by RTD 30 with the set point temperature. The mass and surface area of the jaw 54' are less than that of block 76 so that corresponding operation of the heat pumps 80a and 80b results in jaw 54' being about 2° C. cooler than the block 76. This temperature differential may be readily achieved by heat transfer calculation and/or trial and error with various sizes of jaws and blocks. This temperature differential is sufficient to provide effective heat flow neutralization in the sheath of the probe P that is being calibrated. In this manner, the effective thermal conductivity of the sheath approaches zero and the advantages described above in respect to the comparator 48 are attained in the comparator 74.

Figure 9:
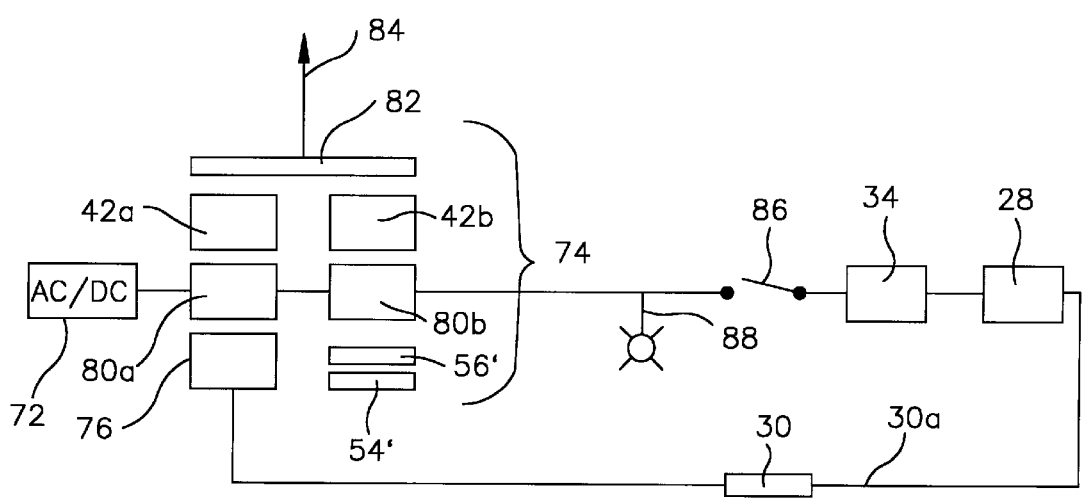
FIG. 9 is a schematic, partially exploded view, block diagram of the control circuitry for the comparator cold component of FIG. 8.

Referring to FIG. 9, therein is shown a schematic diagram of a preferred electrical/electronic circuit for the cool comparator 74. A source of electrical energy is supplied at 72, which drives the series connected heat pumps 80a and 80b to remove heat from the jaw 54' and the metal block 76. The removed heat is dissipated by means of heat sinks 42a, 42b and fan 82 in the direction of the arrow 84. To control the operation of the cool comparator reference RTD probe 30 signals via line 30a temperature control 28 which operates solid state relay gate 34 to measure the temperature of the metal block 76 and to maintain the set point temperature, e.g. −25° C. Manual switch 86 turns the cool source on/off.

When the metal block 76 temperature is stabilized at the set point, the temperature control 28 continuously signals the solid state relay 34 to activate or deactivate the heat pump 80a and 80b. Jaw 54' will be at a temperature about 2° C. cooler than the set point temperature to thereby effect heat flow neutralization in the sheath of the probe and to more quickly and accurately attain temperature stabilization. Light source 88 visually indicates that power is being applied to the heat pump 80a and 80b.

FIG. 10 illustrates a preferred embodiment of an instrument panel and carrying case 90 in which an instrument panel 92 has mounted thereon, for easy access, the jaws 54 and 56 of heat comparator 50, FIG. 6, and the jaws 54' and 56' of cold comparator 74, FIG. 8. Also mounted thereon are heat comparator digital LCD set point temperature readout 94; heat comparator digital LCD probe-sensed temperature readout 96; cold comparator digital LCD set point temperature readout 98; and cold comparator digital LCD probe-sensed temperature readout 100. A cover, not shown, for the carrying case fits over the instrument panel to protect the probe-gripping jaws and LCDs against damage during transport and against air-borne dust and other pollutants when the comparator is not in use. Because a rechargeable battery pack weighs only 4 or 5 pounds, the carrying case can be easily transported by one person. Although only two comparators are shown in FIG. 10, other numbers of comparators may be mounted in the carrying case, and may be all hot, all cold, or combinations of hot and cold comparators.

It will occur to those skilled in the art, upon reading the foregoing description of the preferred embodiments of the invention, taken in conjunction with a study of the drawings, that certain modifications may be made to the invention without departing from the intent or scope of the invention.

I claim:

1. A calibration device for determining whether a heat sensor for measuring temperature is operating within a prescribed tolerance, said device including oven means maintained at a set point temperature to be measured by said heat sensor, and jaw means adjacent said oven means, said heat sensor including first and second portions, said oven means receiving said first portion of said heat sensor in heat transfer relationship for measurement by said heat sensor of said set point temperature maintained in said oven means, said jaw means receiving said second portion of said heat sensor in heat transfer relationship, said jaw means including jaw heat transfer means for transferring heat to or from said jaw means and said second portion of said heat sensor to thereby reduce heat transfer between said first and second portions of said heat sensor.

2. The device of claim 1, wherein said heat sensor first and second portions respectively have first and second temperatures, and said jaw heat transfer means transfers heat to or from said second portion to cause said first and second temperatures to be in heat transfer equilibrium and to tend to eliminate heat transfer between said portions as a result of any difference between said first and second temperatures.

3. The device of claim 2, wherein said first portion is substantially heated or cooled by heat transfer with said oven means only, and said second portion is substantially heated or cooled by heat transfer with said jaw means only when said first and second temperatures are the same.

4. The device of claim 1, wherein said heat sensor includes a sheath enclosing a sensing element, said first and second portions comprise first and second extents of said sheath, and said sensing element is enclosed within said first portion of said heat sensor.

5. The device of claim 1, wherein said heat sensor is formed with a range of sizes and said oven means comprises a cavity sized to receive said range of sizes of said heat sensor.

6. The device of claim 1, wherein said heat sensor is formed with a plurality of cross-sectional shapes and said jaw means include separable jaw members for gripping said plurality of cross-sectional shapes.

7. The device of claim 1, wherein said device includes oven heat transfer means for transferring heat to or from said oven means, and control means for regulating transfer of heat to or from said oven means by said oven heat transfer means to maintain said set point temperature and for regulating transfer of heat to or from said jaw means by said jaw heat transfer means to reduce heat transfer between said first and second portions of said heat sensor.

8. The device of claim 1, wherein said device also comprises a metallic block including a face, said oven means comprise a cavity formed in said block and having a cavity opening located at said face, said jaw means include separable jaw members mounted adjacent said cavity opening, and insulation extending along said face to thermally insulate said block from said jaw means.

9. The device of claim 8, wherein said block includes block heat transfer means for transferring heat to or from said block to maintain said set point temperature.

10. The device of claim 9, wherein said block heat transfer means includes heater means for inputting heat to said block to maintain said set point temperature.

11. The device of claim 9, wherein said block heat transfer means and jaw heat transfer means each include heat pump means for removing heat respectively from said block to maintain said set point temperature and from said jaw means to reduce heat transfer between said first and second portions of said heat sensor.

12. The device of claim 11, wherein said block heat transfer means and jaw heat transfer means each include a heat sink, said heat pump means each comprising a solid state heat pump arranged in heat transfer relationship between said block and the associated one said heat sinks and between said jaw means and the other of said heat sinks.

13. The device of claim 2, wherein said device also includes oven heat transfer means and control means, said control means comprising oven control means for controlling said oven heat transfer means transfer of heat to said oven means to maintain said set point temperature, and jaw control means for controlling said jaw heat transfer means transfer of heat to said jaw means.

14. The device of claim 13, wherein said oven control means for controlling said oven heat transfer means transfer of heat from said oven means to maintain said oven means at said set point temperature and for controlling said jaw heat transfer means transfer of heat from said second portion of said heat sensor.

15. The device of claim 14, wherein said oven heat transfer means and jaw heat transfer means comprise an oven heat pump and a jaw heat pump and said device includes oven control means for controlling removal of heat by said heat pumps from said oven means and jaw means.

16. The device of claim 15, wherein said oven control means controls said oven and jaw heat pumps for corresponding operation, said jaw means having a lesser thermal mass and surface area than said oven means whereby said second temperature is cooler than said first temperature and in heat transfer equilibrium.

17. The device of claim 13, wherein said oven heat transfer means include a block electric energy source for controlled heating or cooling of said block, and said jaw control means include a jaw electric energy source for controlled injection or maintenance of heat transfer to said jaw means.

18. The device of claim 17, wherein said block and jaw electric energy sources are the same.

19. The device of claim 17, wherein said block and jaw electric energy sources comprise a battery and said device is portable.

20. The device of claim 16, wherein jaw means comprise separable metallic jaws, said first temperature is measured in said block adjacent said cavity opening, and said second temperature is measured in one of said metallic jaws adjacent said second portion of said heat sensor.

21. A calibration device for determining whether a heat sensor for measuring temperature is operating within a prescribed tolerance, said device including a metallic block having a cavity maintained at a set point temperature to be measured by said heat sensor, said cavity including an opening for insertion of said heat sensor into said cavity, jaw means adjacent said cavity opening, said heat sensor having a first sheath portion containing a temperature sensing element and a second sheath portion, said cavity receiving said first portion of said heat sensor, said jaw means receiving said second portion of said heat sensor, and jaw heat transfer means for transferring heat to or from said jaw means and said second portion of said heat sensor to thereby reduce heat transfer between said first and second portions of said heat sensor.

22. The device of claim 21, wherein said jaw means include separable jaw members for gripping said second portion of said heat sensor.

23. A method for determining whether a heat sensor for measuring temperature is operating within a prescribed tolerance, said heat sensor including first and second portions, comprising inserting said first portion of said device in an oven means maintained at a set point temperature to be measured by said heat sensor, positioning said second portion of said heat sensor in jaw means thermally insulated from said oven means, transferring heat to or from said jaw means and said second portion of said heat sensor to thereby reduce heat transfer between said first and second portions of said heat sensor, measuring said oven temperature with said heat sensor, and comparing said measured temperature with said set point temperature to determine if said heat sensor is operating within tolerance.

24. The method of claim 23, wherein said heat sensor first and second portions respectively have first and second temperatures, and the step of transferring heat to or from said jaw means and said second portion of said heat sensor includes maintaining said first and second temperatures in heat transfer equilibrium.

25. The method of claim 24, wherein said first portion is substantially heated by heat input from said oven means only, and said second portion is substantially heated or cooled by heat transfer from said jaw means only when said first and second temperatures are in heat transfer equilibrium.

26. The method of claim 25, wherein said heat sensor includes a sheath enclosing a sensing element, said first and second portions comprise first and second extents of said sheath, and said sensing element is enclosed within said sheath of said heat sensor.

27. The method of claim 23, wherein said device includes oven heat transfer means for transferring heat to or from said oven means, and control means for regulating transfer of heat to or from said oven means by said oven heat transfer means to maintain said set point temperature and for regulating transfer of heat to or from said jaw means by said jaw heat transfer means to reduce heat transfer between said first and second portions of said heat sensor.

* * * * *